(12) United States Patent
Fournier et al.

(10) Patent No.: US 10,523,044 B2
(45) Date of Patent: Dec. 31, 2019

(54) DEVICE FOR CONTROLLING THE ELECTRICAL POWER SUPPLY OF A CIRCUIT FOR A VEHICLE, COMPRISING A BATTERY AND CORRESPONDING ASSEMBLY

(71) Applicant: Valeo Systemes Thermiques, Le Mesnil Saint Denis (FR)

(72) Inventors: Jonathan Fournier, Le Mesnil Saint-Denis (FR); Xavier Rousseil, Le Mesnil Saint-Denis (FR); Xavier Goumain, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 207 days.

(21) Appl. No.: 15/556,734

(22) PCT Filed: Feb. 29, 2016

(86) PCT No.: PCT/EP2016/054241
§ 371 (c)(1),
(2) Date: Sep. 8, 2017

(87) PCT Pub. No.: WO2016/146369
PCT Pub. Date: Sep. 22, 2016

(65) Prior Publication Data
US 2018/0131223 A1    May 10, 2018

(30) Foreign Application Priority Data

Mar. 17, 2015   (FR) ...................................... 15 52160

(51) Int. Cl.
*H02J 7/00* (2006.01)
*H02J 7/34* (2006.01)

(52) U.S. Cl.
CPC ............ *H02J 7/345* (2013.01); *H02J 7/0031* (2013.01); *H02J 7/0063* (2013.01)

(58) Field of Classification Search
CPC ......... H02J 7/345; H02J 7/0031; H02J 7/0063
(Continued)

(56) References Cited

U.S. PATENT DOCUMENTS

2010/0090526 A1* 4/2010 Itou ...................... F02N 11/0814
                                                         307/10.6
2010/0142235 A1* 6/2010 Asai ......................... H02M 1/32
                                                         363/53
2014/0077771 A1* 3/2014 Yamashita ............... B60K 6/28
                                                         320/167

FOREIGN PATENT DOCUMENTS

DE           196 18 039 A1    11/1997
DE     10 2007 062955 A1     7/2009
(Continued)

OTHER PUBLICATIONS

International Search Report issued in corresponding application No. PCT/EP2016/054241 dated Apr. 7, 2016 (4 pages).
(Continued)

*Primary Examiner* — Edward Tso
*Assistant Examiner* — Aaron Piggush
(74) *Attorney, Agent, or Firm* — Osha Liang LLP

(57) ABSTRACT

The invention relates to a device for controlling the electrical power supply of a circuit for a vehicle, said vehicle comprising: an electrical battery (2); an electrical energy storage element (C1), one terminal of which is connected to the first terminal (VBAT) of the battery and the other terminal of which is connected to an electrical earth; a first circuit (5), capable of consuming electricity coming from the electrical battery (2), and having first and second terminals respectively connected to the first and second terminals (−VBAT, VBAT) of the battery (2); and electrical supply
(Continued)

management means (Q1) configured to allow or prevent the passage of electrical current between said electrical energy storage element (C1) and said first circuit (5). Said control device comprises detection means (41) configured to detect a drop in voltage of the battery (2) below a threshold value, and command means (42) configured, in the event of detection of a drop in voltage of the battery below said threshold value, to command said electrical supply management means (Q1) in order to prevent the passage of electrical current between the electrical energy storage element (C1) and said first circuit (5).

11 Claims, 1 Drawing Sheet

(58) Field of Classification Search
USPC .................... 320/104, 134, 163, 166, 167
See application file for complete search history.

(56) References Cited

FOREIGN PATENT DOCUMENTS

| DE | 10 2012 009738 A1 | 11/2013 |
|----|-------------------|---------|
| EP | 1 595 748 A1 | 11/2005 |

OTHER PUBLICATIONS

Written Opinion of the International Searching Authority issued in corresponding application No. PCT/EP2016/054241 dated Apr. 7, 2016 (5 pages).

* cited by examiner

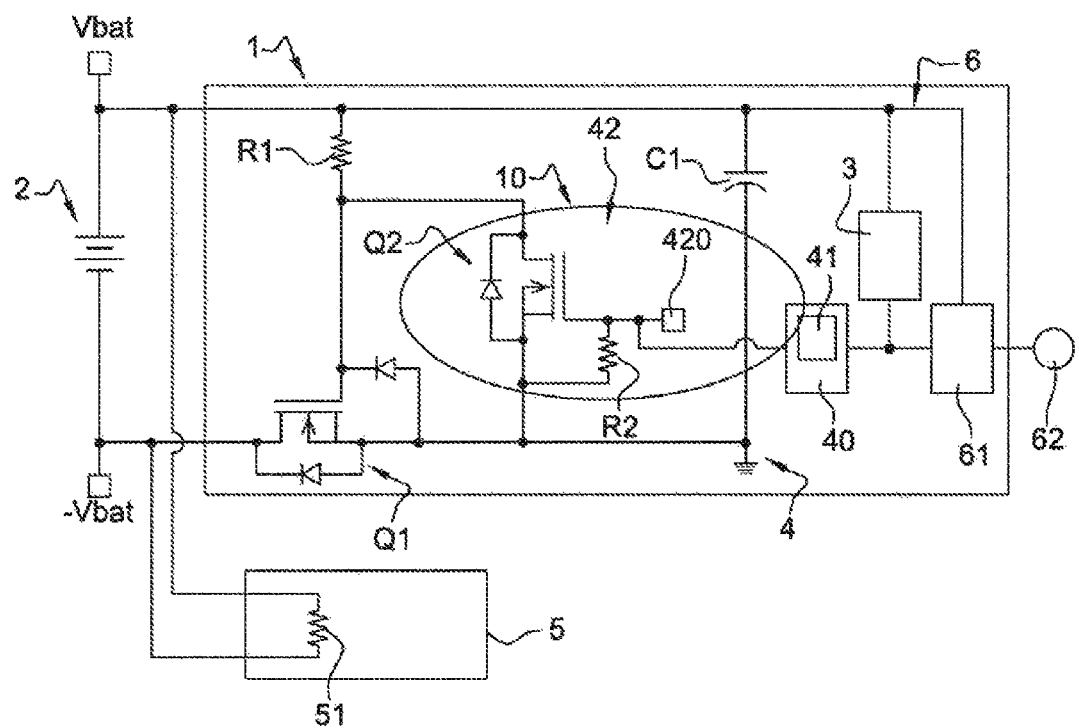

DEVICE FOR CONTROLLING THE ELECTRICAL POWER SUPPLY OF A CIRCUIT FOR A VEHICLE, COMPRISING A BATTERY AND CORRESPONDING ASSEMBLY

The present invention generally relates to the electrical power supply of an electrical or electronic circuit of a motor vehicle provided with an electrical battery.

Usually, a vehicle comprises electrical circuits for powering various electrical equipment, such as an additional heating device or a lighting system. The vehicle also includes electronic circuits and, in particular, a computing and controlling system which comprises, for example, one or more computers for saving data and controlling equipment of the vehicle. These electrical or electronic circuits are intended to be powered by the battery of the vehicle.

However, during the operation of the vehicle, the battery may be subjected to drops in voltage. To compensate for these drops in voltage, the vehicle comprises a capacitive reserve, i.e. a reserve of electrical energy stored by one or more capacitive elements such as a capacitor or a supercapacitor. During a drop in voltage, the capacitive reserve makes it possible to continue powering the circuits of the vehicle in need thereof.

However, it is noted that the capacitive reserve of the vehicle discharges very rapidly. Thus, a computer of the computing and controlling system of the vehicle that is in the process of carrying out a memory write operation may not have sufficient time to complete this operation. The result thereof can be, for example, that the computing and controlling system of the vehicle may generate errors and/or be damaged.

An aim of the present invention is, for example, to propose a new circuit controlling device which makes it possible, in the case of a drop in voltage of the battery, to favor the powering of one or some circuits of the vehicle, for example to reduce the risk of a computer of the vehicle not having the time to complete writing to a memory (such as a read-only memory) of the computing and controlling system.

To this end, the subject matter of the invention is a device for controlling the electrical power supply of a circuit for a vehicle, said vehicle comprising:
- an electrical battery having a first terminal and a second terminal,
- an electrical energy storage element, one terminal of which is linked to the first terminal of the battery and the other terminal of which is linked to an electrical ground,
- a first circuit, capable of consuming electricity coming from the electrical battery, and having a first and a second terminal which are connected to the first and second terminals of the electrical battery, respectively,
- electrical power supply management means configured to allow or prevent the passage of electrical current between said electrical energy storage element and said first circuit, characterized in that said controlling device includes:
- detection means configured to detect a drop in the voltage of the electrical battery below a threshold value;
- command means configured, in the case of detection of a drop in the voltage of the battery below said threshold value, to command said electrical power supply management means to prevent the passage of electrical current between the electrical energy storage element and said first circuit.

Such a controlling device makes it possible, in the case of a drop in voltage of the battery, to favor the powering of one or some circuits of the vehicle, by isolating said first circuit from the energy storage element. Thus, the energy of the energy storage element can be used to continue powering a computer for the time that it takes to finish a memory write operation.

Such a device also makes it possible, in the case where said first circuit includes one or more transistors, to reduce the risk of damage to said transistor(s) of this first circuit. In the absence of such a controlling device, the drop in voltage could force the transistor(s) to operate in linear mode which could damage them.

According to an advantageous characteristic of the invention, said first terminal of the battery is the positive terminal and said second terminal is the negative terminal.

According to an advantageous characteristic of the invention, said electrical power supply management means comprise a first transistor.

Thus, said command means are configured to command, in the case of detection of a drop in the voltage of the battery below said threshold value, the off-state of the first transistor.

According to an advantageous characteristic of the invention, said first transistor has an input electrode connected to the first terminal of the battery, an output electrode connected to said second terminal of said first circuit, and a further output electrode connectable to the electrical ground.

According to an advantageous characteristic of the invention, said command means comprise a transistor command module and a second transistor comprising an input electrode connected to said command module, an output electrode connectable to the electrical ground and a further output electrode connectable to the input electrode of the first transistor.

According to an advantageous characteristic of the invention, said device comprises a resistor, one terminal of which is connected to the input electrode of the second transistor and the other terminal of which is connectable to the electrical ground.

According to an advantageous characteristic of the invention, since the device comprises a computer processing unit, said detection means are implemented in the form of computer instructions programmed in said unit.

According to an advantageous characteristic of the invention, the device comprises a converter configured to convert the voltage of the battery into a reduced voltage, and said detection means are configured to interpret said reduced voltage supplied by the converter.

According to an alternative embodiment of the invention, said detection means comprise a hysteresis comparator.

According to an advantageous characteristic of the invention, said energy storage element comprises one or more capacitors.

The invention also relates to an assembly for a vehicle, said vehicle comprising:
- an electrical battery having a first terminal and a second terminal,
- an electrical energy storage element, one terminal of which is linked to the first terminal of the battery and the other terminal of which is linked to an electrical ground, said assembly comprising:
- a first circuit, capable of consuming electricity coming from the electrical battery, and having a first and a second terminal which are connectable to the first and second terminals of the electrical battery, respectively, electrical power supply management means configured to allow or prevent the passage of electrical current between said electrical energy storage element and said first circuit, said assembly also comprising a second circuit connectable to the storage element so as to be able to be powered by said storage element, characterized in that said assembly also comprises a controlling device as described above.

Preferentially, the second circuit comprises a computer processing unit and a memory in which said computer processing unit is capable of performing a write operation.

Advantageously, said assembly includes a third circuit connected to the energy storage element, said third circuit comprising a motor and a command module for said motor, and the second circuit comprises a controlling unit connected to the command module for said motor and configured, in the case of detection of a drop in voltage by said detection means, to transmit, to said command module, an order for shut down of said motor.

The invention will be clearly understood on reading the following description of an exemplary embodiment, with reference to the single FIGURE which is a diagram of the controlling device according to the invention associated with a battery and electrical and electronic circuits.

As stated above, the invention relates to a device 10 for controlling the electrical power supply of a circuit for a vehicle. Preferentially, said vehicle is a motor vehicle, such as a car. Said vehicle comprises an electrical and/or electronic installation 1 which comprises an electrical battery 2 and electrical and/or electronic circuits.

The electrical battery 2 has a first terminal VBAT, namely the positive terminal of the battery, and a second terminal –VBAT, namely the negative terminal of the battery.

The vehicle also comprises an electrical energy storage element, one terminal of which is linked to the first terminal VBAT and the other terminal of which is linked to an electrical ground. In the example illustrated in the FIGURES, the electrical energy storage element comprises a capacitor C1.

Said electrical or electronic circuits comprise elements capable of consuming electricity coming from the electrical battery 2. Said circuits comprise, in particular, a first circuit 5 connected to the first and second terminals –VBAT, VBAT of the battery 2. Said first circuit 5 comprises an element 51 capable of consuming electricity coming from the electrical battery 2, for example an additional heating element or a lighting system.

The electrical and/or electronic installation 1 comprises electrical power supply management means configured to allow or prevent the passage of electrical current between said electrical energy storage element C1 and said first circuit 5.

In the example illustrated in the FIGURE, the electrical power supply management means comprise a first transistor Q1, called a battery reversing transistor.

As detailed hereafter, said electrical power supply management means Q1 are commandable, during a drop in voltage of the battery below a given threshold value, so as to prevent the passage of electrical current between the electrical energy storage element C1 and said first circuit 5, i.e. such that the energy storage element C1 cannot electrically power said at least one circuit 5.

Said transistor Q1 has an input electrode connected to the first terminal VBAT of the battery, via a resistor R1, an output electrode connected to the second terminal –VBAT of the battery, and a further output electrode connected to an electrical ground. The electrical ground can be included in the controlling device or in another part of the vehicle. By way of example, a resistor R1 value equal to 10 kOhms can be chosen.

The first transistor Q1 makes it possible to detect reverse mounting of the battery. Indeed, in the case of reversed connection of the terminals of the battery 2, the voltage on the input electrode of the first transistor Q1 is not sufficient to provide for the passage of current between the output electrodes of the first transistor Q1 such that the first transistor Q1 forms an open switch between the first circuit 5 and the capacitor C1 which, therefore, cannot power the first circuit 5. Conversely, when the battery is correctly connected, therefore when the first terminal VBAT is connected to the input of the first transistor Q1, via the resistor R1, the voltage to which it is subjected provides for the passage of current between the output electrodes of the first transistor Q1, which allows the first circuit 5 to be powered, if necessary, by the capacitor C1 so as to be able to compensate, up to a certain level, for a voltage drop of the battery 2.

The controlling device 10 makes it possible to control the first transistor Q1. Said controlling device 10 comprises detection means 41 configured to detect a drop in the voltage of the battery 2 below a threshold value, for example below 7 Volts.

Said controlling device 10 also comprises command means 42 configured, in the case of detection by the detection module 41 of a voltage of the battery 2 less than said threshold value, to command the off-state of the first transistor Q1, so as to prevent the first circuit 5 from being powered by discharging the capacitor C1.

Said command means 42 comprise a transistor command module 420 and a second transistor Q2. The second transistor Q2 comprises an input electrode connected to said command module 420, an output electrode connected to the electrical ground and a further output electrode connected to the input electrode of the first transistor Q1.

The command means 42 are arranged with the energy storage element C1 in order to be able to be powered by said energy storage element C1 in the case of a drop in voltage of the battery.

A resistor R2, for example of 10 kOhms, has a terminal connected to the input electrode of the second transistor Q2 and a terminal connected to the electrical ground. This resistor R2 thus makes it possible to keep by default, i.e. when there is no command of voltage in order to keep the second transistor Q2 on, the input electrode at a defined potential close to the ground (0 Volts) and therefore to keep the second transistor Q2 in the off-state.

Preferentially, the controlling device 10 comprises a computer processing unit 40, used, for example, as a computer, and said detection means 41 are implemented in the form of a group of computer instructions, which group is saved and can be executed by the computer processing unit 40. Advantageously, the computer processing unit 40 is a microcontroller or a microprocessor. The computer processing unit 40 also comprises means for transmitting an order signal to the command module 420 depending on the result of the detection. The order signal may be a binary signal: a signal at 0 to leave the second transistor Q2 off and a signal at 1 to command the command module 420 to apply a voltage to the input electrode of the second transistor Q2 such that it is on.

The device comprises a converter 3 connected to the battery and configured to convert the voltage of the battery 2 applied at the input of the converter into a reduced output voltage. The computer processing unit 40 comprises a terminal connected to the output of said converter 3. Said detecting means 41 are configured to acquire the reduced output voltage of said converter 3 and detect whether the reduced output voltage corresponds to a drop in the battery voltage below said threshold value.

According to an alternative not illustrated in the FIGURES, said detection means can be implemented in the form of an electronic component or components separate from a computer processing unit. Thus, according to a particular embodiment, said detection means comprise a hysteresis comparator. Implementing the detection means using electronic components makes it possible to improve the responsiveness of the device compared to a computer solution.

The electrical and/or electronic installation comprises a second circuit 4 connected to the storage element so as to be able to be powered by the capacitor C1 in the off-state of said first transistor Q1. Said command means 42 form part of this second circuit 4. Thus, during normal operation, said command means 42 are powered by the battery and, in the case of a drop in voltage, they can, while continuing to be powered by the capacitor C1, command the off-state of the first transistor Q1 so that the first circuit 5 does not consume the energy of the capacitor C1.

In the example illustrated in the FIGURE, said assembly includes a third circuit 6 connected to the energy storage element C1 in order to be able to be powered by said energy storage element. Said third circuit 6 comprises an electrical motor 62 and a command module 61 for said motor 62. Said motor is, for example, the drive motor for a fan mounted in a housing of a heating, ventilation and/or air conditioning (called HVAC) set.

The second circuit 4 comprises a controlling unit, preferably formed by the computer processing unit 40, connected to the command module 61 for said motor 62 and configured, in the case of detection of a drop in voltage by said detection means, to transmit, to said command module 61, an order for shut down of said motor 62.

Thus, in the case of an excessive drop in voltage of the battery, the second circuit 4, which comprises said command means 42, continues to be powered by the capacitor so as to make it possible, firstly, to command the opening of the switch formed by the first transistor Q1 in order to isolate the second circuit 5 from the capacitor C1, and, secondly, to command the shut down of the motor 62 via the transmission of an order to the command module 61 thereof. Thus, the first and third circuits 5, 6 do not consume the energy of the capacitor C1, which energy can be reserved for the operation of another circuit, in particular for the operation of the computer processing unit 40 of the second circuit 4 in order to enable it to complete a memory write operation. Said memory is, for example, an electrically-erasable programmable read-only memory, also called an EEPROM.

Although at least one embodiment of the invention has been illustrated and described, it should be noted that other modifications, substitutions and alternatives become apparent to a person skilled in the art and can be changed without departing from the scope of the subject matter described herein.

The present application envisages covering all the adjustments and variations of the embodiments described above. Moreover, the word "comprising" does not exclude other elements or steps and the term "a" does not exclude the plural. Furthermore, characteristics or steps which have been described with reference to one of the embodiments set forth above may also be used in combination with other characteristics or steps of other embodiments set forth above. It will be noted that it is necessary to include, in the scope of the patent, all the modifications envisaged above insofar as they form part of the contribution of the inventors to the prior art. Such modifications, substitutions and alternatives can be carried out without departing from the scope and the spirit of the present invention.

The invention claimed is:

1. A device for controlling the electrical power supply of a circuit for a vehicle,
    said vehicle comprising:
        an electrical battery having a first terminal and a second terminal;
        an electrical energy storage element, one terminal of which is linked to the first terminal of the battery and another terminal of which is linked to an electrical ground;
        a first circuit capable of consuming electricity coming from the electrical battery, and having a first and a second terminal which are connected to the first and second terminals of the electrical battery, respectively;
        electrical power supply management means configured to allow or prevent the passage of electrical current between said electrical energy storage element and said first circuit,
        wherein said electrical power supply management means comprise a first transistor having an input electrode connected to the first terminal of the battery, an output electrode connected to said second terminal of said first circuit, and a further output electrode configured to connect to the electrical ground;
    said device comprising:
        detection means configured to detect a drop in the voltage of the electrical battery below a threshold value; and
        command means configured, in the case of detection of a drop in the voltage of the battery below said threshold value, to command said electrical power supply management means to prevent the passage of electrical current between the electrical energy storage element and said first circuit.

2. The device as claimed in claim 1, wherein said command means comprise a transistor command module and a second transistor comprising an input electrode connected to said command module, an output electrode connectable to the electrical ground and a further output electrode connectable to the input electrode of the first transistor.

3. The device as claimed in claim 2, wherein said device comprises a resistor, one terminal of which is connected to the input electrode of the second transistor and the other terminal of which is connectable to the electrical ground.

4. The device as claimed in claim 1, further comprising a computer processing unit, wherein said detection means are implemented in the form of computer instructions programmed in said computer processing unit.

5. The device as claimed in claim 4, wherein the device further comprises a converter configured to convert the voltage of the battery into a reduced voltage, and said detection means being configured to interpret said reduced voltage supplied by the converter.

6. The device as claimed in claim 1, wherein said detection means comprise a hysteresis comparator.

7. The device as claimed in claim 1, wherein said energy storage element comprises one or more capacitors.

8. An assembly for a vehicle,
    said vehicle comprising:

an electrical battery having a first terminal and a second terminal; and an electrical energy storage element, one terminal of which is linked to the first terminal of the battery and another terminal of which is linked to an electrical ground;

said assembly comprising:

a first circuit, capable of consuming electricity coming from the electrical battery, and having a first and a second terminal connectable to the first and second terminals of the electrical battery, respectively;

electrical power supply management means configured to allow or prevent the passage of electrical current between said electrical energy storage element and said first circuit, wherein said electrical power supply management means comprise a first transistor having an input electrode connected to the first terminal of the battery, an output electrode connected to said second terminal of said first circuit, and a further output electrode connectable to the electrical ground;

a second circuit connectable to the storage element and configured to be powered by said storage element; and a controlling device comprising:

detection means configured to detect a drop in the voltage of said electrical battery below a threshold value; and command means configured, in the case of detection of a drop in the voltage of the battery below said threshold value, to command said electrical power supply management means to prevent the passage of electrical current between the electrical energy storage element and said first circuit.

9. The assembly as claimed in claim 8, wherein the second circuit comprises a computer processing unit and a memory in which said computer processing unit is capable of performing a write operation.

10. The assembly as claimed in claim 8, further comprising a third circuit connected to the energy storage element, said third circuit comprising a motor and a command module for said motor, wherein the second circuit comprises a controlling unit connected to the command module for said motor and configured, in the case of detection of a drop in voltage by said detection means, to transmit, to said command module, an order for shut down of said motor.

11. A motor vehicle comprising:

an electrical battery having a first terminal and a second terminal;

an electrical energy storage element, one terminal of which is linked to the first terminal of the battery and another terminal of which is linked to an electrical ground;

a first circuit capable of consuming electricity coming from the electrical battery, and having a first and a second terminal which are connected to the first and second terminals of the electrical battery, respectively; and electrical power supply management means configured to allow or prevent the passage of electrical current between said electrical energy storage element and said first circuit, wherein said electrical power supply management means comprise a first transistor having an input electrode connected to the first terminal of the battery, an output electrode connected to said second terminal of said first circuit, and a further output electrode connectable to the electrical ground, and wherein the electrical power supply of the first circuit is controlled by a device comprising:

detection means configured to detect a drop in the voltage of the electrical battery below a threshold value, and command means configured, in the case of detection of a drop in the voltage of the battery below said threshold value, to command said electrical power supply management means to prevent the passage of electrical current between the electrical energy storage element and said first circuit.

* * * * *